US011387482B2

(12) United States Patent
Aikata et al.

(10) Patent No.: US 11,387,482 B2
(45) Date of Patent: Jul. 12, 2022

(54) ENERGY STORAGE DEVICE AND ENERGY STORAGE MODULE

(71) Applicants: Robert Bosch GmbH, Stuttgart (DE); GS Yuasa International Ltd., Kyoto (JP)

(72) Inventors: Riku Aikata, Kyoto (JP); Sho Kozono, Kyoto (JP)

(73) Assignees: GS YUASA INTERNATIONAL LTD., Kyoto (JP); ROBERT BOSCH GMBH, Stuttgart (DE)

(*) Notice: Subject to any disclaimer, the term of this patent is extended or adjusted under 35 U.S.C. 154(b) by 7 days.

(21) Appl. No.: 16/621,653

(22) PCT Filed: Jun. 18, 2018

(86) PCT No.: PCT/EP2018/066049
§ 371 (c)(1),
(2) Date: Dec. 11, 2019

(87) PCT Pub. No.: WO2018/234207
PCT Pub. Date: Dec. 27, 2018

(65) Prior Publication Data

US 2020/0194819 A1 Jun. 18, 2020

(30) Foreign Application Priority Data

Jun. 19, 2017 (JP) ............................ JP2017-119273

(51) Int. Cl.
*H01M 10/04* (2006.01)
*H01M 50/54* (2021.01)
(Continued)

(52) U.S. Cl.
CPC ..... *H01M 10/0413* (2013.01); *H01M 50/103* (2021.01); *H01M 50/3425* (2021.01); *H01M 50/54* (2021.01); *H01M 2220/20* (2013.01)

(58) Field of Classification Search
None
See application file for complete search history.

(56) References Cited

U.S. PATENT DOCUMENTS

2012/0015218 A1 1/2012 Lee
2012/0015235 A1 1/2012 Fuhr et al.
(Continued)

FOREIGN PATENT DOCUMENTS

JP H05-65054 U 8/1993
JP 2000-182591 A 6/2000
(Continued)

OTHER PUBLICATIONS

Machine Translation of KR101487392 (Year: 2014).*
(Continued)

*Primary Examiner* — Wyatt P McConnell
(74) *Attorney, Agent, or Firm* — McGinn I.P. Law Group, PLLC.

(57) ABSTRACT

An energy storage device includes: a case having a bottom wall and a ceiling wall, a front wall and a rear wall having areas smaller than an area of the ceiling wall respectively, and a pair of side walls having areas larger than the area of the ceiling wall respectively; a stacked electrode assembly accommodated in the inside of the case, and having a plurality of positive electrode plates and a plurality of negative electrode plates having a plate shape and stacked to each other with a separator interposed between the positive electrode plate and the negative electrode plate, and a positive electrode tab and a negative electrode tab extending from the positive electrode plates and the negative electrode plates toward the front wall; and an external terminal mounted on the front wall and electrically connected with the positive electrode tab or the negative electrode tab.

18 Claims, 6 Drawing Sheets

(51) Int. Cl.

| | |
|---|---|
| ***H01M 50/103*** | (2021.01) |
| ***H01M 50/342*** | (2021.01) |

(56) References Cited

U.S. PATENT DOCUMENTS

| | | | | |
|---|---|---|---|---|
| 2016/0293917 | A1* | 10/2016 | Matsudo | H01M 10/0525 |
| 2016/0293926 | A1 | 10/2016 | Yamada | |
| 2017/0077555 | A1* | 3/2017 | Hayashi | H01M 4/48 |

FOREIGN PATENT DOCUMENTS

| | | | |
|---|---|---|---|
| JP | 2003-303581 | A | 10/2003 |
| JP | 2005-197279 | A | 7/2005 |
| JP | 2011-249107 | A | 12/2011 |
| JP | 2014-192055 | A | 10/2014 |
| JP | H 2014-235845 | A | 12/2014 |
| KR | 2014-0032193 | A | 3/2014 |

OTHER PUBLICATIONS

International Search Report (ISR) (PCT Form PCT/ISA/210), in PCT/EP2018/066049, dated Dec. 12, 2018.

Concise Explanation of Relevance for Japanese Patent Application No. JP H05-65054 U.

* cited by examiner

ENERGY STORAGE DEVICE AND ENERGY STORAGE MODULE

TECHNICAL FIELD

The present invention relates to an energy storage device and an energy storage module.

BACKGROUND ART

A chargeable and dischargeable energy storage device is used in various equipment such as a mobile phone and an automobile. A vehicle which uses electric energy as a power source such as an electric vehicle (EV) or a plug-in hybrid electric vehicle (PHEV) requires a large energy. Accordingly, a large-capacity energy storage module which includes a plurality of energy storage devices is mounted on such a vehicle.

JP-A-2005-197279 discloses an energy storage module in which a plurality of energy storage devices are accommodated in such a manner that the energy storage devices are arranged in a depth direction. In such an energy storage module, the individual energy storage device includes a case having a rectangular parallelepiped shape where a depth (short side wall) is small compared to a height and a width (long side wall) and a width is large compared to the height.

In general, an energy storage device is configured such that an electrode assembly formed by stacking positive electrode plates and negative electrode plates to each other with a separator interposed between the positive electrode plate and the negative electrode plate and an electrolyte solution are stored in a hermetic case. A pair of electrodes (external terminals) which is electrically connected with the electrode assembly is mounted on a ceiling wall of the case.

With respect to such an energy storage device, in a case where an abnormal external force is applied to the energy storage device in a use-in state which is usually unpredictable or the like, there is a possibility that a temperature in the case is elevated so that a gas is generated. Accordingly, the energy storage device includes a safety valve for discharging a gas in the case by opening the safety valve when an internal pressure in a container is elevated to a predetermined pressure or more.

As such a safety valve, as described in JP-A-2005-197279, there has been used a safety valve (a rupture valve) which is mounted on a ceiling wall of a container and has a plurality of rupture lines with a reduced thickness for being broken and opened along with an increase of an internal pressure in a case. The rupture valve is designed such that a flap-shaped (tongue-shaped) portion defined by the plurality of rupture lines is flipped open toward the outside of the container so that an opening having a predetermined area is formed whereby a gas in the case can be rapidly discharged.

PRIOR ART DOCUMENTS

Patent Documents

Patent Document 1: JP-A-2005-197279

SUMMARY OF THE INVENTION

Problems to be Solved by the Invention

An energy storage module used in an electric vehicle, a plug-in hybrid electric vehicle or the like is requested to be mounted in a space having a relatively small height such as a space below a seat, for example.

In the conventional energy storage module described in JP-A-2005-197279, external electrodes (external terminals) and the rupture valve of the energy storage device are disposed on the ceiling wall of the case. Accordingly, to enable the arrangement of the structure for connecting the external electrodes of a plurality of energy storage devices with each other and to enable releasing of a gas in the case by the flipping of the tongue of the rupture valve, it is necessary for the energy storage device to ensure a space having a predetermined height on an upper side of the energy storage device case. Further, it is necessary for the energy storage device to form a gas discharge passage for discharging a gas discharged from the rupture valve on an upper side of the plurality of energy storage device cases.

It is difficult to dispose such a conventional energy storage module in a space where a height is limited while allowing the energy storage module to ensure a large capacity.

It is an object of the present invention to provide an energy storage module suitable for a case where the energy storage module is disposed in a space where a height is limited while allowing the energy storage module to ensure a large capacity, and an energy storage device capable of providing such an energy storage module.

Means for Solving the Problems

An energy storage device according to an aspect of the present invention includes: a case formed in a rectangular parallelepiped shape, and having a bottom wall and a ceiling wall, a front wall and a rear wall having areas smaller than an area of the ceiling wall respectively, and a pair of side walls having areas larger than the area of the ceiling wall respectively; a stacked electrode assembly accommodated in the inside of the case, and having a plurality of positive electrode plates and a plurality of negative electrode plates having a plate shape and stacked to each other with a separator interposed between the positive electrode plate and the negative electrode plate, and a positive electrode tab and a negative electrode tab extending from the positive electrode plates and the negative electrode plates toward the front wall; an external terminal mounted on the front wall and is electrically connected with the positive electrode tab or the negative electrode tab; and a rupture valve mounted on the rear wall, wherein the bottom wall is mounted on a mounting surface, and the front wall is raised from the bottom wall, and the rupture valve is mounted at a position shifted from a center of the rear wall in a direction in which the bottom wall and the ceiling wall opposedly face each other.

An energy storage module according to another aspect of the present invention includes: a plurality of the energy storage devices; and a holder capable of holding the plurality of energy storage devices in a state where the energy storage devices are arranged in two rows, wherein the energy storage devices disposed adjacently to each other in the each row have the side walls thereof opposedly face each other, the energy storage devices disposed adjacently to each other between the rows have rear walls thereof opposedly face each other, and a shifted position of the rupture valve mounted on one of the two rear walls which opposedly face each other between the rows and a shifted position of the rupture valve mounted on the other of the two rear walls which opposedly face each other between the rows are disposed opposite to each other with respect to a center of the rear wall in a direction in which the bottom wall and the ceiling wall opposedly face each other.

Advantages of the Invention

The energy storage module according to the present invention is suitable for being installed in a space where a height is limited while allowing the energy storage module to ensure a large capacity.

MODE FOR CARRYING OUT THE INVENTION

Figure 1:
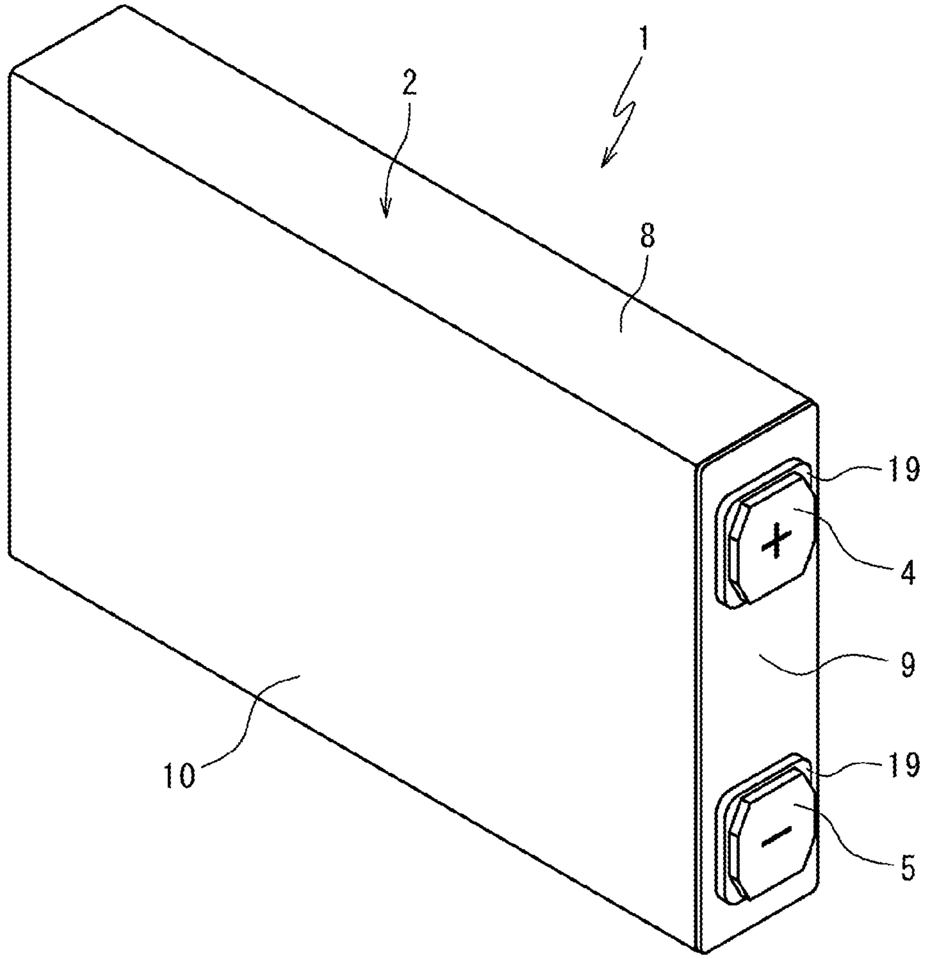
FIG. 1 is a schematic perspective view showing an energy storage device according to one embodiment of the present invention.
Figure 2:
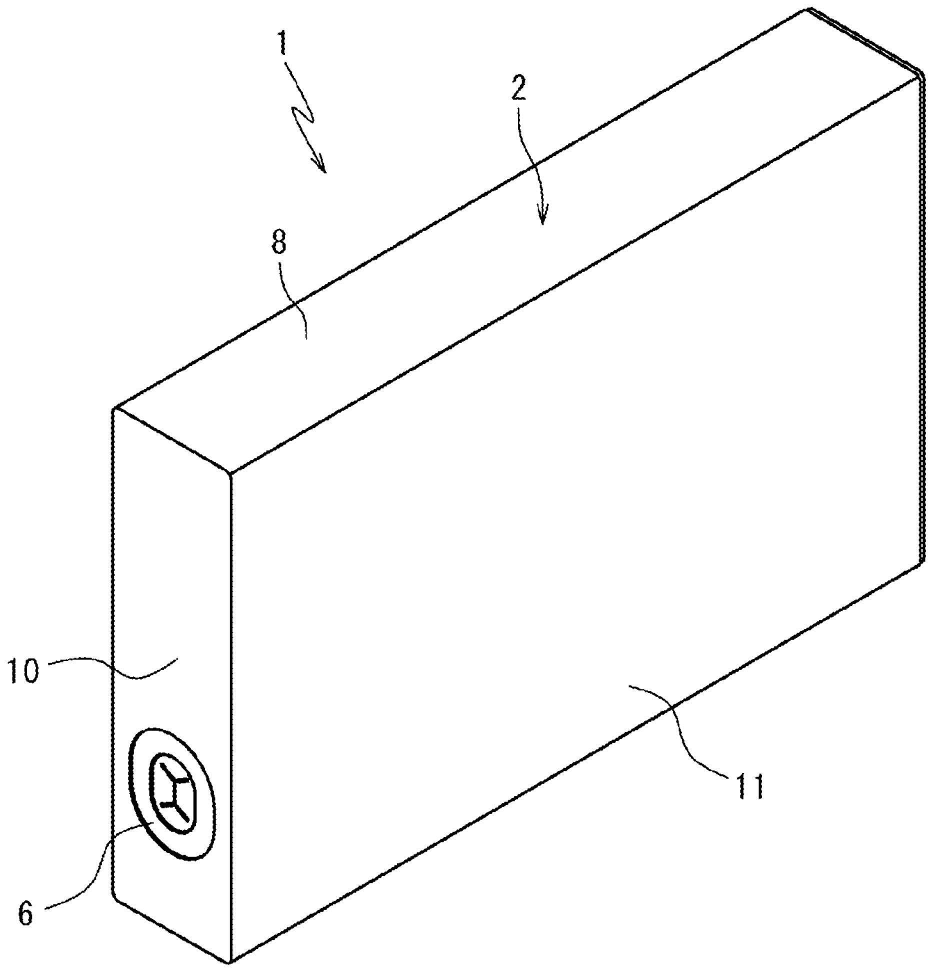
FIG. 2 is a schematic perspective view showing the energy storage device on a side opposite to a side of the energy storage device shown in FIG. 1.
Figure 3:
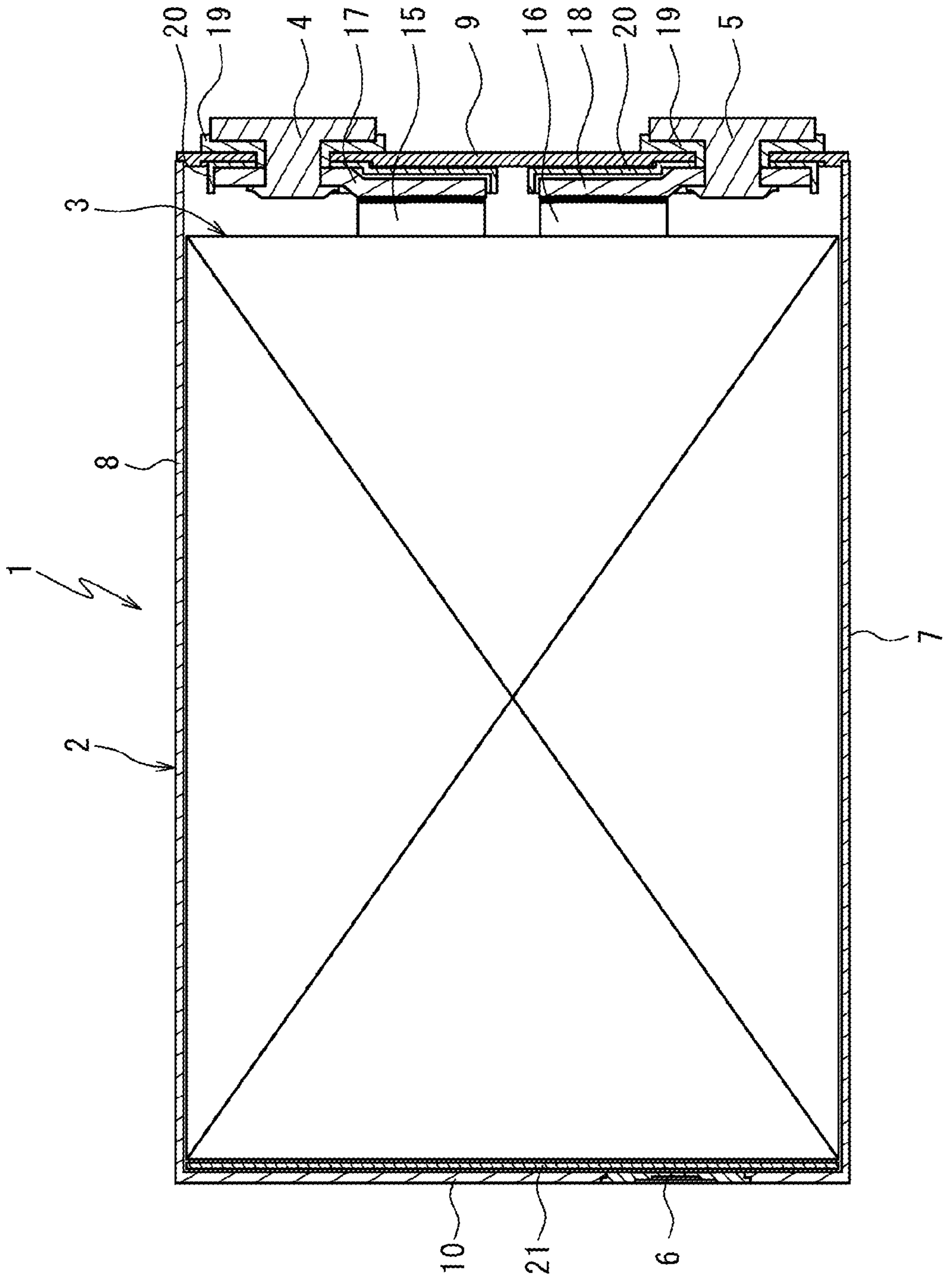
FIG. 3 is a schematic cross-sectional view of the energy storage device shown in FIG. 1 taken along a plane parallel to a side wall of the energy storage device.
Figure 4:
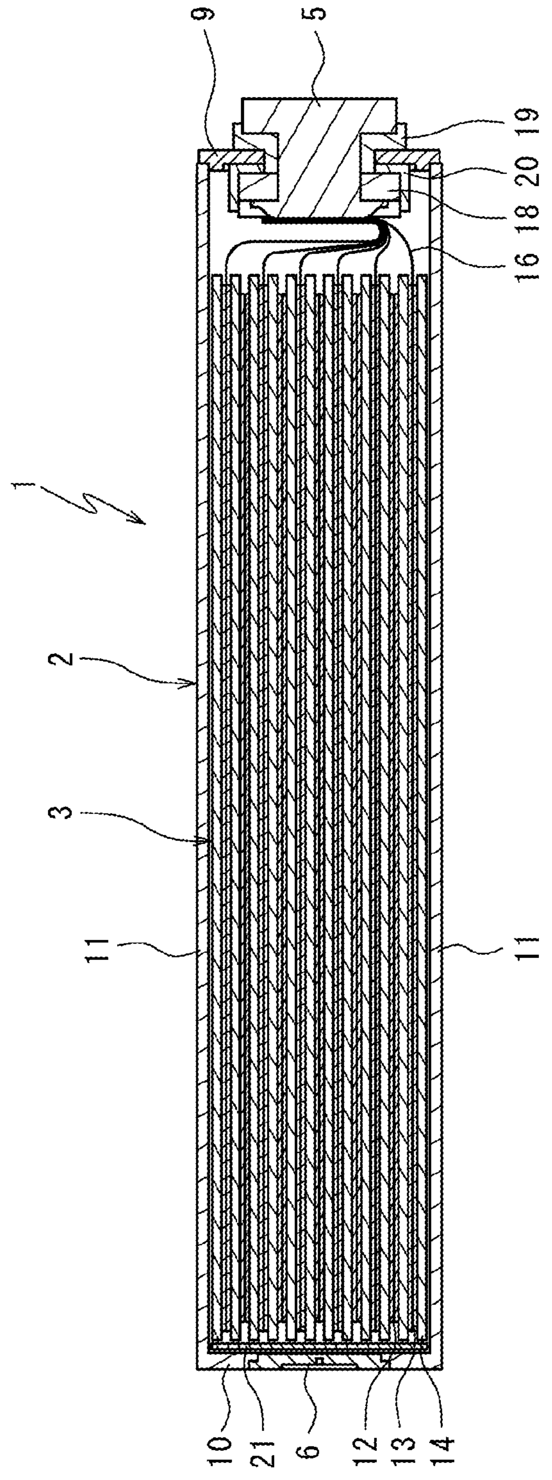
FIG. 4 is a schematic cross-sectional view of the energy storage device shown in FIG. 1 taken along a plane parallel to a bottom wall of the energy storage device.

An energy storage device according to an aspect of the present invention includes: a case formed in a rectangular parallelepiped shape, and having a bottom wall and a ceiling wall, a front wall and a rear wall having areas smaller than an area of the ceiling wall respectively, and a pair of side walls having areas larger than the area of the ceiling wall respectively; a stacked electrode assembly accommodated in the inside of the case, and having a plurality of positive electrode plates and a plurality of negative electrode plates having a plate shape and stacked to each other with a separator interposed between the positive electrode plate and the negative electrode plate, and a positive electrode tab and a negative electrode tab extending from the positive electrode plates and the negative electrode plates toward the front wall; an external terminal mounted on the front wall and is electrically connected with the positive electrode tab or the negative electrode tab; and a rupture valve mounted on the rear wall, wherein the bottom wall is mounted on a mounting surface, and the front wall is raised from the bottom wall, and the rupture valve is mounted at a position shifted from a center of the rear wall in a direction in which the bottom wall and the ceiling wall opposedly face each other.

In the energy storage device, the external terminal and the rupture valve are separately mounted on the front wall and the rear wall having the least area respectively. By separately mounting the external terminal and the rupture valve, a space which the structure for electrical connection between the stacked electrode assembly and the external terminal occupies can be made relatively small. Further, in the energy storage device, the rupture valve mounted on the rear wall is disposed in a state where the rupture valve is shifted from the center of the rear wall in the direction that the bottom wall and the ceiling wall opposedly face each other. Accordingly, in disposing two energy storage devices in a state where two energy storage devices have the rear walls thereof opposedly face each other, shift amounts of the rupture valves can be made different from each other and hence, even when the rupture valve of one energy storage device is opened, it is possible to prevent a gas jetting from the opened rupture valve from impinging on the rupture valve of the other energy storage device. Accordingly, even when a distance between the energy storage devices is made small, undesired opening of the rupture valve can be prevented and hence, the plurality of energy storage devices can be arranged densely. As a result, energy density of the energy storage module can be increased compared to a case where an energy storage device having the conventional structure is adopted.

The energy storage device may further include a porous sheet disposed between an inner surface of the rear wall and the stacked electrode assembly and covering an inner surface of the rupture valve. With such a configuration, it is possible to suppress jetting of a solid substance such as a broken piece of the electrode plate to the outside at the time of opening of the rupture valve. Further, it is possible to alleviate an impact transferred to the stacked electrode assembly when an impact is applied to the energy storage device while maintaining the distance between the stacked electrode assembly and the rear wall at a minimum level.

In the energy storage device, the case may include: a bottomed cylindrical case body forming the bottom wall, the ceiling wall, the pair of side walls, and the rear wall; and a lid plate forming the front wall and being capable of sealing an opening of the case body. With such a configuration, the bottom wall, the ceiling wall, the pair of side walls, and the rear wall are integrally formed with each other and hence, the deformation of the rear wall is suppressed whereby it is possible to suppress a change in an opening pressure generated by deformation of the rupture valve.

An energy storage module according to another aspect of the present invention includes: a plurality of the energy storage devices; and a holder capable of holding the plurality of energy storage devices in a state where the energy storage devices are arranged in two rows, wherein the energy storage devices disposed adjacently to each other in the each row have the side walls thereof opposedly face each other, the energy storage devices disposed adjacently to each other between the rows have rear walls thereof opposedly face each other, and a shifted position of the rupture valve mounted on one of the two rear walls which opposedly face each other between the rows and a shifted position of the rupture valve mounted on the other of the two rear walls which opposedly face each other between the rows are disposed opposite to each other with respect to a center of the rear wall in a direction in which the bottom wall and the ceiling wall opposedly face each other.

In the energy storage module, as viewed in a plan view, the plurality of energy storage devices are disposed such that the rear wall of the energy storage device faces the inside and the front wall on which the external terminal is mounted faces the outside and hence, the energy storage devices can be easily electrically connected with each other using the external terminals collectively disposed on the outside. A size of the accommodated stacked electrode assembly as viewed in a plan view is increased by expanding a distance between the front wall and the rear wall of the case. Accordingly, even when the energy storage module is disposed in a space where a height is limited, energy density can be increased. Further, in the energy storage module, the rupture valves of the energy storage devices disposed adjacently to each other between the rows are arranged in a displaced manner from each other and hence, it is possible to prevent the occurrence of a phenomenon where, due to opening of the rupture valve of one energy storage device, an external pressure is applied to the rupture valve of the other energy storage device so that the rupture valve of the other energy storage device is opened unnecessarily.

In the energy storage module, it is preferable that the rupture valve mounted on one of the two rear walls which opposedly face each other between the rows, and the rupture valve mounted on the other of the two rear walls which opposedly face each other between the rows do not overlap with each other in the direction that the bottom wall and the ceiling wall opposedly face each other. With such a configuration, it is possible to prevent a substance jetting from the energy storage device due to opening of the rupture valve of one energy storage device from impinging on the rupture valve of the other energy storage device with more certainty.

In the energy storage module, a gas discharge passage may be defined between one and the other of the two rear walls which opposedly face each other between the rows. With such a configuration, without increasing the number of parts, a substance jetted from the energy storage device due to opening of the rupture valve can be smoothly discharged to the outside of the energy storage module so that an internal pressure of the energy storage device can be rapidly lowered.

Hereinafter, an embodiment of the present invention is described in detail with reference to drawings when appropriate.

FIG. 1 to FIG. 4 show an energy storage device 1 according to one embodiment of the present invention.

The energy storage device 1 includes: a rectangular parallelepiped case 2; a stacked electrode assembly 3 accommodated in the case 2; a positive electrode external terminal 4 and a negative electrode external terminal 5; and a rupture valve 6 mounted on the case 2. An electrolyte solution is sealed in the case 2 together with the stacked electrode assembly 3.

The case 2 has: a rectangular-shaped bottom wall 7 and a rectangular-shaped ceiling wall 8 which are disposed opposite to each other and have substantially the same size; a rectangular-shaped front wall 9 and a rectangular-shaped rear wall 10 which connect short sides of the bottom wall 7 and short sides of the ceiling wall 8 to each other respectively and have an area smaller than an area of the bottom wall 7 and the ceiling wall 8; and a pair of rectangular-shaped side walls 11 which connects long sides of the bottom wall 7 and long sides of the ceiling wall 8 to each other respectively and have an area larger than the area of the bottom wall 7 and the ceiling wall 8.

The positive electrode external terminal 4 and the negative electrode external terminal 5 are mounted on the front wall 9 of the case 2. The rupture valve 6 is mounted on the rear wall 10 disposed on a side opposite to the front wall 9.

The stacked electrode assembly 3 includes: a plurality of rectangular plate-shaped positive electrode plates 12, a plurality of rectangular plate-shaped negative electrode plates 13, and a plurality of separators 14 which are stacked to each other; positive electrode tabs 15 which extend from the positive electrode plates 12 toward the front wall 9; and negative electrode tabs 16 which extend from the negative electrode plates 13 toward the front wall 9. To be more specific, the stacked electrode assembly 3 has: a body formed in an approximately rectangular parallelepiped shape by stacking the plurality of positive electrode plates 12 and the plurality of negative electrode plates 13 with the separator 14 interposed between the positive electrode plate 12 and the negative electrode plate 13; and the positive electrode tabs 15 and the negative electrode tabs 16 extending from the body. The number of stacked positive electrode plates 12 can be set from forty to sixty, for example, for allowing the energy storage device to have high capacity. The number of negative electrode plates 13 can be set substantially equal to the number of positive electrode plates 12.

The positive electrode tabs 15 of the stacked electrode assembly 3 are electrically connected to the positive electrode external terminal 4, and the negative electrode tabs 16 are electrically connected to the negative electrode external terminal 5. To be more specific, the positive electrode tabs 15 are connected to a plate-like positive electrode current collecting member 17 which extends along the front wall 9 from the positive electrode external terminal 4 inside the case 2. The negative electrode tabs 16 are connected to a plate-like negative electrode current collecting member 18 which extends along the front wall 9 from the negative electrode external terminal 5 inside the case 2.

The positive electrode external terminal 4 and the negative electrode external terminal 5 are disposed outside the front wall 9, and respectively have a plate-like terminal portion to which a bus bar or a wire is connected, and a shaft portion which extends from the terminal portion and penetrates the front wall 9.

The positive electrode external terminal 4 and the negative electrode external terminal 5 are respectively not electrically connected to the front wall 9. The positive electrode external terminal 4 and the negative electrode external terminal 5 are respectively gas-tightly fixed to the front wall 9 in such a manner that an outer gasket 19 having insulating property and an inner gasket 20 having insulating property are sandwiched between the positive electrode external terminal 4 and the front wall 9 and between the negative electrode external terminal 5 and the front wall 9 respectively so as to prevent leakage of an electrolyte solution.

The rupture valve 6 is disposed at a position shifted from the center of the rear wall 10 in a direction in which the bottom wall 7 and the ceiling wall 8 opposedly face each other (vertical direction). Preferably, the rupture valve 6 is disposed such that the whole rupture valve 6 falls within a bottom-wall-7-side half region of the rear wall 10 or a ceiling-wall-8-side half region of the rear wall 10.

The rupture valve 6 is a safety valve for lowering an internal pressure by releasing a gas in the case 2 by forming an opening in the case 2 when a gas is generated in the case 2 and an internal pressure of the energy storage device reaches a predetermined pressure in an abnormal situation which is not a usually predicable in-use state at the time of collision of a vehicle on which the energy storage device is mounted.

The rupture valve 6 has a groove which is formed by partially decreasing a plate thickness of the rupture valve 6. When an internal pressure of the energy storage device is increased, the rupture valve 6 breaks along the groove thus forming a flap-shaped (tongue-shaped) portion, and an opening is formed in the rear wall 10 by the flipping of the flap-shaped portion to the outside.

It is preferable that a porous sheet 21 having cushion property be disposed between the rear wall 10 on which the rupture valve 6 is mounted and the stacked electrode assembly 3.

Hereinafter, the respective constitutional elements of the energy storage device are described in detail.

The case 2 holds the stacked electrode assembly 3 in a state where the stacked electrode assembly 3 is immersed in an electrolyte solution and, at the same time, the case 2 protects the stacked electrode assembly 3.

As a material for forming the case 2, metal such as aluminum, an aluminum alloy or stainless steel, a resin or the like can be used, for example.

It is preferable that the case 2 have: a bottomed cylindrical case body which forms the bottom wall 7, the ceiling wall 8, the rear wall 10 and the pair of side walls 11; and a lid plate which forms the front wall 9 and seals the opening of the case body. In this manner, the bottom wall 7, the ceiling wall 8, the rear wall 10 and the pair of side walls 11 are integrally formed with the use of the bottomed cylindrical case body and hence, a strength of the case 2 can be increased. The rear wall 10 on which the rupture valve 6 is mounted is integrally formed with the bottom wall 7, the ceiling wall 8, the rear wall 10, and the pair of side walls 11 and hence, deformation of the rear wall 10 can be suppressed so that irregularities in pressure at the time of opening the rupture valve 6 can be reduced A length of long sides of the front wall 9 is set to a value equal to or less than an allowable height of the energy storage device 1, and can be set to a value which falls within a range of from 7 cm to 11 cm inclusive, for example. On the other hand, a length of short sides of the front wall 9 is selected in conformity with the specification of the stacked electrode assembly 3, and such a length can be set to a value which falls within a range of from 2 cm to 5 cm inclusive, for example. Further, a length of long sides of the bottom wall 7 is set to a value equal to or less than an allowable length of the energy storage device 1, and can be set to a value which falls within a range of from 10 cm to 20 cm inclusive, for example.

A thickness of the front wall 9 can be set to a value which falls within a range of from 0.5 mm to 2 mm inclusive, for example although such a thickness is set depending on a material and a size of the energy storage device. On the contrary, a thickness of the rear wall 10 can be set to a value which falls within a range of from 0.5 mm to 1.8 mm inclusive, for example. Further, thicknesses of the bottom wall 7, the ceiling wall 8, and the pair of side walls 11 can be set to values which fall within a range of from 0.5 mm to 1.5 mm inclusive, for example. In this manner, with respect to the case 2, it is preferable to set thicknesses of the front wall 9 and the rear wall 10 larger than thicknesses of the bottom wall 7, the ceiling wall 8, and the pair of side walls 11 which are integrally formed with each other in a rectangular cylindrical shape. Further, it is preferable that a thickness of the front wall 9 which is joined last be set larger than a thickness of the rear wall 10 which can be integrally formed with the bottom wall 7, the ceiling wall 8, and the pair of side walls 11.

The positive electrode plate 12 has: a foil-like or a sheet-like positive electrode current collector having conductivity; and a positive active material layer which is stacked on both surfaces of the positive electrode current collector.

As a material for forming the positive electrode current collector of the positive electrode plate 12, metal such as aluminum, copper, iron or nickel, or an alloy of such metal is used. Among these materials, from a viewpoint of taking a balance between conductivity and a cost, aluminum, an aluminum alloy, copper, and a copper alloy are preferably used, and aluminum and an aluminum alloy are more preferably used. Further, as the shape of the positive electrode current collector, the positive electrode current collector may be formed of a foil, a vapor deposition film or the like. From a viewpoint of a cost, the positive electrode current collector may be preferably formed of a foil. That is, the positive electrode current collector may be preferably formed of an aluminum foil. As aluminum or an aluminum alloy, A1085P, A3003P prescribed in JIS-H4000 (2014) or the like can be exemplified.

The positive active material layer of the positive electrode plate 12 is a porous layer made of a so-called composite material containing a positive active material. A composite material which forms the positive active material layer contains arbitrary components such as a conductive agent, a binding agent (binder), a thickening agent, a filler and the like when necessary.

As the positive active material, for example, a composite oxide expressed by $Li_xMO_y$ (M indicating at least one kind of transition metal) ($Li_xCoO_2$, $Li_xNiO_2$, $Li_xMn_2O_4$, $Li_xMnO_3$, $Li_xNi_\alpha Co_{(1-\alpha)}O_2$, $Li_xNi_\alpha Mn_\beta Co_{(1-\alpha-\beta)}O_2$, $Li_xNi_\alpha Mn_{(2-\alpha)}O_4$ or the like), or a polyanion compound expressed by $Li_wMe_x(XO_y)_z$ (Me indicating at least one kind of transition metal, X being P, Si, B, V or the like, for example) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like) can be named. An element or a polyanion in these compounds may be partially replaced with other element or other anion species. In the positive active material layer, one kind of these compounds may be used singly or two or more kinds of compounds are used in a mixed form. Further, it is preferable that the crystal structure of the positive active material be a layered structure or a spinel structure.

The negative electrode plate 13 has: a foil-like or a sheet-like negative electrode current collector having conductivity; and a porous negative active material layer stacked on both surfaces of the negative electrode current collector.

As a material for forming the negative electrode current collector of the negative electrode plate 13, it is preferable to use copper or a copper alloy. Further, as the shape of the negative electrode current collector, a foil is preferable. That is, the negative electrode current collector of the negative electrode plate 13 may preferably be formed of a copper foil. As the copper foil used for forming the negative electrode current collector, a rolled copper foil, an electrolytic copper foil or the like is exemplified, for example.

The negative active material layer is a porous layer made of a so-called composite material containing a negative active material. Further, a composite material which forms the negative active material layer contains arbitrary components such as a conductive agent, a binding agent (binder), a thickening agent, a filler and the like when necessary.

As a negative active material, a material which can occlude and discharge lithium ions is preferably used. As a specific negative active material, metal such as lithium or a lithium alloy; a metal oxide; a polyphosphoric acid compound; a carbon material such as graphite, non-crystalline carbon (easily graphitizable carbon or hardly graphitizable carbon) or the like can be named, for example.

Among the above-mentioned negative active materials, from a viewpoint of setting a discharge capacity per unit opposedly facing area between the positive electrode plate 12 and the negative electrode plate 13 within a preferable range, it is preferable to use Si, an Si oxide, Sn, an Sn oxide or a combination of these materials. It is particularly preferable to use an Si oxide. Si and Sn can have a discharge capacity approximately three times as large as a discharge capacity of graphite when Si and Sn are used in the form of an oxide.

The separator 14 is made of a sheet-like or a film-like material which allows the infiltration of an electrolyte solution into the separator 14. As a material for forming the separator 14, a sheet-like or a film-like porous resin is typically used although a woven fabric, a non-woven fabric or the like can be also used, for example. The separator 14 makes the positive electrode plate 12 and the negative electrode plate 13 separate from each other and, at the same time, retains an electrolyte solution between the positive electrode plate 12 and the negative electrode plate 13.

As a main component of the separator 14, for example, a polyolefin such as polyethylene (PE), polypropylene (PP), ethylene-vinyl acetate copolymer, ethylene-methylacrylate copolymer, ethylene ethyl acrylate copolymer, a polyolefin derivative such as chlorinated polyethylene or an ethylene-propylene copolymer; polyester such as polyethylene terephthalate or copolymerized polyester and the like can be adopted. Among these main components of the separator 14, polyethylene and polypropylene which are excellent in electrolyte solution resistance, durability, and weldability are particularly preferably used.

It is preferable that the separator 14 have a heat resistance layer on both surfaces or one surface thereof (preferably, a surface which opposedly faces the positive electrode plate 12). With such a configuration, breaking of the separator 14 due to heat can be prevented and hence, short-circuiting between the positive electrode plate 12 and the negative electrode plate 13 can be prevented with more certainty.

The heat resistance layer or an oxidation resistant layer of the separator 14 may contain a large number of inorganic particles, and a binder which connects the inorganic particles to each other. The oxidation resistant layer may be thinner than the heat resistance layer. Although the oxidation resistant layer protects the separator under a high voltage environment, the separator may not have a sufficient heat resistance property.

As a main component of the inorganic particles, for example, an oxide such as alumina, silica, zirconia, titania, magnesia, ceria, yttria and zinc oxide, iron oxide; a nitride such as silicon nitride, titanium nitride and boron nitride; silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, and the like can be named. Among these main components, as the main component of the inorganic particles of the heat resistance layer, alumina, silica, and titania are particularly preferable.

The positive electrode tab 15 and the negative electrode tab 16 can be formed by extending the positive electrode current collector of the positive electrode plate 12 and the negative electrode current collector of the negative electrode plate 13 in a projecting manner in a strip shape respectively from a rectangular region where an active material layer is stacked.

The positive electrode tabs 15 and the negative electrode tabs 16 project from one side of the body of the stacked electrode assembly 3 such that the positive electrode tabs 15 and the negative electrode tabs 16 do not overlap with each other as viewed in the stacking direction. The positive electrode tabs 15 extend from the positive electrode plates 12 and the negative electrode tabs 16 extend from the negative electrode plates 13, and the positive electrode tabs 15 and the negative electrode tabs 16 are respectively stacked into a bundle.

The positive electrode tabs 15 and the negative electrode tabs 16 can be connected to a portion of the positive electrode current collecting member 17 and a portion of the negative electrode current collecting member 18 which extend substantially parallel to the front wall 9 while avoiding a mounting structure of the positive electrode current collecting member 17 and the negative electrode current collecting member 18 to the positive electrode external terminal 4 and the negative electrode external terminal 5. Accordingly, it is preferable that the positive electrode tabs 15 and the negative electrode tabs 16 extend from a region of the stacked electrode assembly 3 where the electrode assembly 3 does not opposedly face inner end portions of the positive electrode external terminal 4 and the negative electrode external terminal 5, and be connected to the positive electrode current collecting member 17 and the negative electrode current collecting member 18 in a state where distal end portions of the positive electrode tabs 15 and the negative electrode tabs 16 are folded in parallel to the front wall 9.

The positive electrode external terminal 4 and the negative electrode external terminal 5 are terminals for supplying power to the stacked electrode assembly 3 from the outside or taking out power from the stacked electrode assembly 3 to the outside, and are configured in a connectable manner to an external electric circuit.

Accordingly, the positive electrode external terminal 4 and the negative electrode external terminal 5 are made of a material having conductivity respectively. It is preferable that at least a portion of the positive electrode external terminal 4 which is exposed to the inside of the case 2 and at least a portion of the negative electrode external terminal 5 which is exposed to the inside of the case 2 be made of the same kinds of metals as the positive electrode current collector and the negative electrode current collector respectively.

With respect to the positive electrode current collecting member 17 and the negative electrode current collecting member 18, by dividing the respective current collecting members 17, 18 into the structure for fixing the positive electrode external terminal 4 and the negative electrode external terminal 5 to the front wall 9, and the structure for electrically connecting the positive electrode tabs 15 and the negative electrode tabs 16 to the positive electrode external terminal 4 and the negative electrode external terminal 5, a size of a space which these structures occupy in a thickness direction of the front wall 9 can be made small. With such a configuration, a volume of the body of the stacked electrode assembly 3 in the case 2 can be increased so that energy density of the energy storage device 1 can be increased.

By using the plate-like positive electrode current collecting member 17 and the plate-like negative electrode current collecting member 18 which extend parallel to the front wall 9, a contact area between the positive electrode current collecting member 17 and the positive electrode tabs 15 and a contact area between the negative electrode current collecting member 18 with the negative electrode tabs 16 can be easily increased. Accordingly, an electric resistance between the positive electrode external terminal 4 and the positive electrode tabs 15, and an electric resistance between the negative electrode external terminal 5 and the negative electrode tabs 16 can be made small.

Mounting of the positive electrode current collecting member 17 on the positive electrode external terminal 4 and mounting of the negative electrode current collecting member 18 on the negative electrode external terminal 5 can be performed by swaging which presses and expands an end portion of the positive electrode external terminal 4 which penetrates the positive electrode current collecting member 17 and an end portion of the negative electrode external terminal 5 which penetrates the negative electrode current collecting member 18 or the like, for example. In this case, with such crimping, the positive electrode external terminal 4 and the negative electrode external terminal 5 are fixed to the front wall 9 simultaneously.

Connection of the positive electrode tabs 15 to the positive electrode current collecting member 17 and connection of the negative electrode tabs 16 to the negative electrode current collecting member 18 can be performed by ultrasonic welding, laser welding, swaging or the like, for example.

It is preferable that the positive electrode current collecting member 17 be made of the same kind of metal as the positive electrode current collector, and the negative electrode current collecting member 18 be made of the same kind of metal as the negative electrode current collector.

As an electrolyte solution sealed in the case 2 together with the stacked electrode assembly 3, a known electrolyte solution which is usually used for an energy storage device can be used. For example, a solution can be used where lithium hexafluorophosphate ($LiPF_6$) or the like is dissolved in a solvent containing a cyclic carbonate such as an ethylene carbonate (EC), a propylene carbonate (PC), or a butylene carbonate (BC); or a chain carbonate such as a diethyl carbonate (DEC), a dimethyl carbonate (DMC) or an ethyl-methyl carbonate (EMC).

As the rupture valve 6, a rupture valve having a known configuration can be adopted where an opening is formed at a predetermined pressure. The rupture valve 6 may be integrally formed with the rear wall 10 by forming a groove on a material for forming the rear wall 10. Alternatively, a plate-like body on which the rupture valve 6 is formed by preliminarily forming a groove on a plate-like body may be mounted on an opening formed in the rear wall 10 by welding.

The porous sheet (cushion sheet) 21 can suppress jetting of a broken piece of the stacked electrode assembly 3 or the like to the outside at the time of opening of the rupture valve 6. The porous sheet 21 can alleviate an impact applied to the stacked electrode assembly 3 from the rear wall 10, for example, at the time of dropping of the energy storage device 1 or the like thus preventing the stacked electrode assembly 3 from being damaged.

As the porous sheet 21, a sheet which has cushion property and can form a flow passage for discharging a gas to the outside of the energy storage device 1 through the rupture valve 6 by, for example, being broken or dissolved at the time of opening the rupture valve 6 is used.

As the porous sheet 21, a resin foamed body can be used.

As a material for forming the porous sheet 21, a resin which contains ethylene propylene rubber as a main component or the like can be used, for example.

An average thickness of the porous sheet 21 can be set to a value which falls within a range of from 0.5 mm to 2.0 mm inclusive, for example. With such a configuration, a force applied to the stacked electrode assembly 3 can be dispersed thus preventing internal short-circuiting of the stacked electrode assembly 3 with more certainty.

The Asker C hardness of the porous sheet 21 is preferably set within a range of from 5 to 40 inclusive. Further, apparent density of the porous sheet 21 is preferably set to a value which falls within a range of from 0.09 g/$cm^3$ to 0.18 g/$cm^3$ inclusive.

To be more specific, as such a porous sheet 21, for example, rubber sponges "E4088", "E4488" made by INOAC CORPORATION and the like, can be used.

In the energy storage device 1 having the above-mentioned configuration, an area of the front wall 9 on which the positive electrode external terminal 4 and the negative electrode external terminal 5 are mounted is small and hence, the space which the structure for connecting the positive electrode tabs 15 including the positive electrode current collecting member 17 to the positive electrode external terminal 4 occupies and the space which the structure for connecting the negative electrode tabs 16 including the negative electrode current collecting member 18 to the negative electrode external terminal 5 occupies are relatively small.

When the energy storage device 1 is used for a vehicle-use energy storage module where a height for the energy storage device 1 is limited, to increase a capacity of the energy storage device 1, a height of the front wall 9 cannot be increased and hence, lengths of the bottom wall 7, the ceiling wall 8, and the pair of side walls 11 (a distance between the front wall 9 and the rear wall 10) is increased. In such an energy storage device 1, even when a capacity of the energy storage device 1 is increased, spaces which the structures for connecting the positive electrode tab 15 and the negative electrode tab 16 of the stacked electrode assembly 3 to the positive electrode external terminal 4 and the negative electrode external terminal 5 occupy are not increased.

In this manner, the energy storage device 1 is configured such that the larger the capacity of the energy storage device 1, the smaller the space which the structure for internal electric connection occupies becomes relatively. Accordingly, compared to the conventional structure, energy density can be further increased. That is, with the use of the energy storage device 1, it is possible to provide an energy storage module which can be installed in a space where a height is limited while allowing the energy storage module to ensure a large capacity.

In the energy storage device 1, the rupture valve 6 is mounted on the rear wall 10 which is disposed opposite to the front wall 9 on which the positive electrode external terminal 4 and the negative electrode external terminal 5 are mounted and hence, the positive electrode external terminal 4 and the negative electrode external terminal 5 do not interfere with the rupture valve 6. Accordingly, in the energy storage device 1, an opening area of the rupture valve 6 can be increased. As a result, in the energy storage device 1, when an internal pressure of the case 2 reaches a predetermined pressure in an abnormal situation which is not a usually predicable in-use state, the rupture valve 6 rapidly opens with certainty thus rapidly lowering an internal pressure and hence, even when energy density of the energy storage device 1 is increased, safety of the energy storage device 1 can be maintained.

In the energy storage device 1, the rupture valve 6 is mounted at a position shifted from the center of the rear wall 10 in the direction that the bottom wall 7 and the ceiling wall 8 opposedly face each other. Accordingly, when the energy storage device 1 is disposed such that the rear wall 10 opposedly faces a rear wall of another energy storage device, the rupture valve 6 of the energy storage device 1 does not opposedly face a rupture valve of another energy storage device. With such a configuration, it is possible to prevent the occurrence of a phenomenon that a gas jetted when an internal pressure of only the energy storage device 1 is increased and the rupture valve 6 of the energy storage device 1 is opened impinges on the rupture valve of another energy storage device and unnecessarily opens the rupture valve of another energy storage device. It is also possible to prevent the occurrence of a phenomenon that a gas jetted when an internal pressure of only another energy storage device is increased and the rupture valve 6 of another energy storage device is opened impinges on the rupture valve of the energy storage device 1 and unnecessarily opens the rupture valve of the energy storage device 1.

That is, the energy storage device 1 can share a space for jetting a gas at the time of opening the rupture valve 6 in common with another energy storage device and hence, a space which a gas jetting passage occupies substantially becomes small whereby a volume of the case 2, eventually, a capacity of the stacked electrode assembly 3 can be increased thus increasing energy density of the energy storage device 1.

Figure 5:
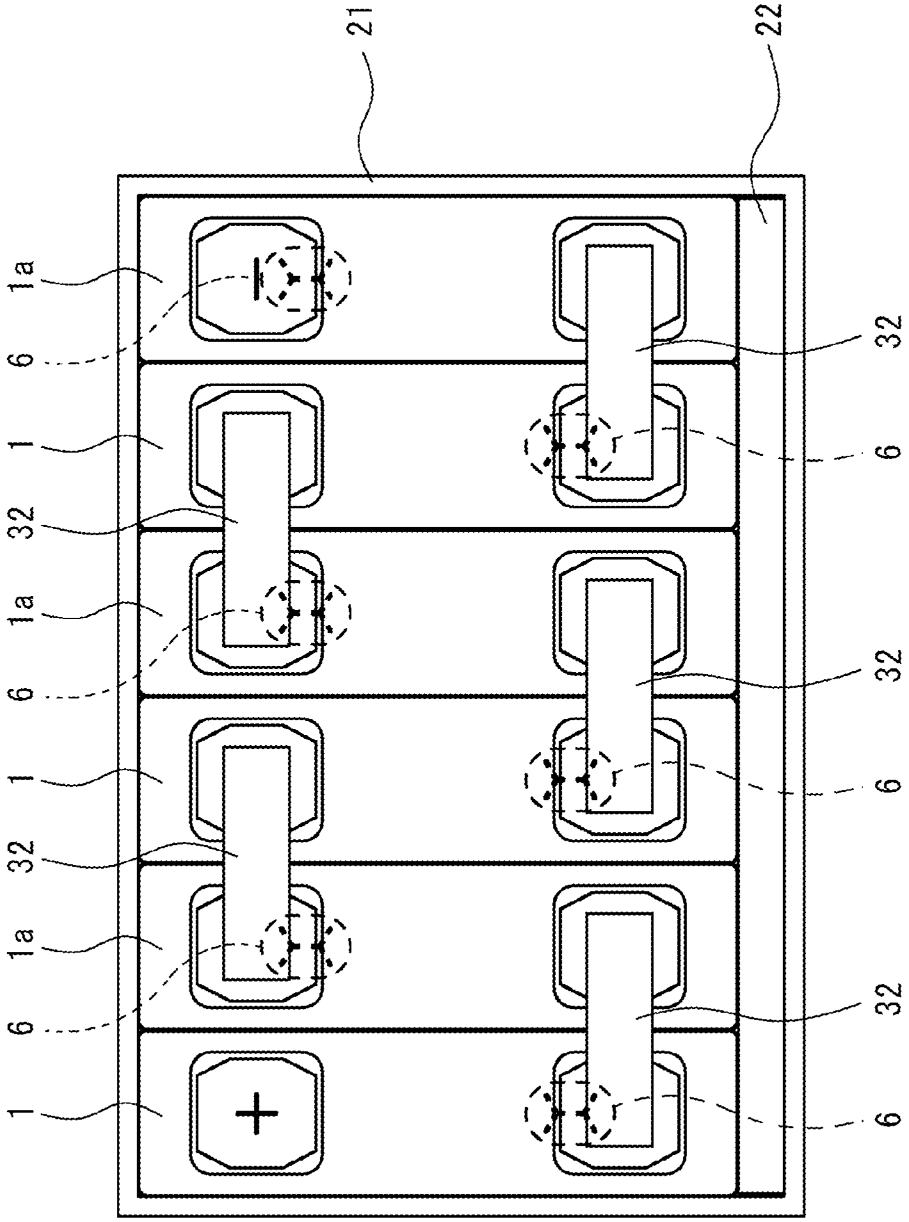
FIG. 5 is a schematic front view of an energy storage module having the energy storage device shown in FIG. 1.
Figure 6:
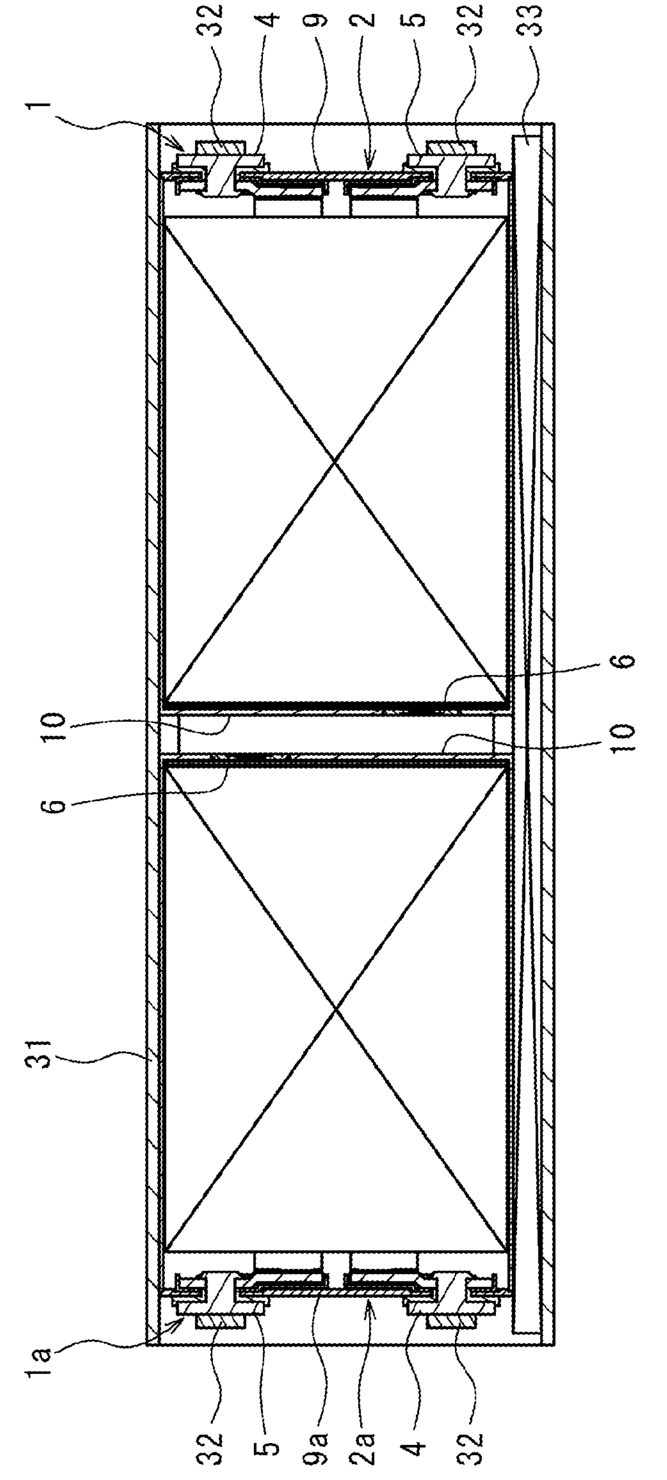
FIG. 6 is a schematic cross-sectional view of the energy storage module shown in FIG. 5.

FIG. 5 and FIG. 6 show one embodiment of an energy storage module according to another aspect of the present invention.

The energy storage module includes a plurality of energy storage devices, and a holder 31 which holds the plurality of energy storage devices in two rows.

The plurality of energy storage devices of the energy storage module are formed of; a plurality of first energy storage devices 1 according to the above-mentioned embodiment; and a plurality of second energy storage devices 1*a* where the arrangement of a positive electrode external terminal 4 and a negative electrode external terminal 5 on a front wall 9 are opposite to the corresponding arrangement of the positive electrode external terminal 4 and a negative electrode external terminal 5 in the energy storage device 1 and eventually the arrangement of a stacked electrode assembly 3 is opposite to the corresponding arrangement of the stacked electrode assembly 3 in the energy storage device 1, and offset directions of rupture valves 6 mounted on rear walls 10 are opposite to each other in a vertical direction.

The second energy storage device 1*a* has substantially the same configuration as the first energy storage device 1 except for the difference in the vertical relationship of rupture valves 6. Accordingly, constitutional elements of the second energy storage device 1*a* identical with the corresponding constitutional elements of the first energy storage device 1 are given the same symbols, and the repeated description of these constitutional elements is omitted. In the case where a bottom wall 7 and a ceiling wall 8 of the first energy storage device 1 have the same configuration, the first energy storage device 1 can be used as the second energy storage device 1*a* by setting the first energy storage device 1 upside down.

The energy storage module further includes bus bars 32 for electrically connecting the plurality of energy storage devices 1, 1*a* to each other. It is preferable for the energy storage module to further include a cooling member 33 which forms a mounting surface on which the plurality of energy storage devices 1, 1*a* are mounted.

The holder 31 can be formed of a frame or a box body which holds the plurality of energy storage devices 1, 1*a*. The holder 31 may have a mechanism for pressing the energy storage devices 1, 1*a* such that side walls 11 of the energy storage devices 1, 1*a* disposed adjacently to each other are brought into close contact with each other, and a mechanism for pressing the plurality of energy storage devices 1, 1*a* held by the holder 31 such that the plurality of energy storage devices 1, 1*a* are brought into close contact with the cooling member 33.

The holder 31 holds the plurality of energy storage devices 1, 1*a* in two rows such that the first energy storage devices 1 and the second energy storage devices 1*a* are alternately disposed in each row, and the first energy storage device 1 and the second energy storage device 1*a* disposed adjacently to each other have side walls 11 thereof opposedly face each other. The holder 31 holds the first and second energy storage devices 1, 1*a* such that the first energy storage device 1 and the second energy storage device 1*a* are disposed adjacently to each other between the rows and have the rear walls 10 thereof opposedly face each other.

In the holder 31, a gap is formed between the rear wall 10 of the first energy storage device 1 and the rear wall 10 of the second energy storage device 1*a* which opposedly face each other between the rows, and the gap defines a gas discharge passage for discharging a gas jetted when either one of the rupture valves 6 opens to the outside of the energy storage module. With such a configuration, in the energy storage module, when an internal pressure of either one of the energy storage devices 1, 1*a* is increased and the rupture valve 6 is opened, a gas jetted from the rupture valve 6 can be smoothly discharged to the outside of the energy storage module so that an internal pressure of the energy storage devices 1, 1*a* can be rapidly lowered.

Accordingly, it is preferable that the holder 31 have projecting portions which be disposed partially between the first energy storage device 1 and the second energy storage device 1*a*. Alternatively, the energy storage module may further include, besides the holder 31, spacers each of which is disposed between the energy storage devices 1, 1*a* which opposedly face each other between rows thus defining a gas discharge passage.

In the energy storage module, the first energy storage device 1 and the second energy storage device 1*a* are disposed adjacently to each other between the rows and hence, the shifted positions of the rupture valves 6 mounted on the rear walls 10 of the energy storage devices 1, 1*a* which opposedly face each other between the rows are disposed opposite to each other with respect to the center of the rear wall 10. With such a configuration, when the rupture valve 6 of one energy storage device is opened and a gas is jetted from the rupture valve 6, it is possible to prevent the gas from impinging on the rupture valve 6 of the other energy storage device and hence, there is no possibility that the rupture valve 6 is unnecessarily opened due to impingement of a gas. Accordingly, in the energy storage module, a width of the gas discharge passage formed between the rows of the energy storage devices 1, 1*a* can be set to a necessary minimum width for discharging a gas and hence, energy density of the energy storage module can be further increased.

In the energy storage module, it is preferable that the rupture valve 6 of the first energy storage device 1 and the rupture valve 6 of the second energy storage device 1*a* not overlap with each other in the direction that the bottom wall 7 and the ceiling wall 8 opposedly face each other. That is, it is preferable that the rupture valves 6 of the energy storage devices 1, 1*a* disposed adjacently to each other between rows not overlap with each other as viewed in the direction that the front wall 9 and the rear wall 10 opposedly face each other. As described previously, such an arrangement is realized by arranging the whole rupture valve 6 within a bottom-wall-7-side half region of the rear wall 10 or within a ceiling-wall-8-side half region of the rear wall 10. Since the rupture valves 6 of the energy storage devices 1, 1*a* disposed adjacently to each other between rows do not overlap with each other, it is possible to prevent a substance jetting from the energy storage device due to opening of the rupture valve 6 of one energy storage device from impinging on the rupture valve 6 of the other energy storage device with more certainty.

Each bus bar 32 connects the positive electrode external terminal 4 of the energy storage device 1 and the negative electrode external terminal 5 of the energy storage device 1*a* to each other thus electrically connecting the energy storage devices 1, 1*a* in series.

The bus bar 32 can be formed using a metal plate or the like, for example.

The cooling member 33 has a mounting surface on which the energy storage devices 1, 1*a* are mounted, and is brought into contact with the bottom walls 7 of the energy storage devices 1, 1*a* thus taking heat from the energy storage devices 1, 1*a* through the bottom walls 7. The cooling member 33 has a plate-like outer shape, and is configured to include a flow passage through which a refrigerant flows.

For preventing lowering of heat transfer efficiency caused by formation of a minute gap between the cooling member 33 and the bottom walls 7, a heat transfer sheet made of elastomer, high polymer gel or the like, for example, may be arranged between the cooling member 33 and the bottom walls 7 of the energy storage devices 1, 1*a*.

The energy storage module includes the cooling member 33 which is brought into contact with the bottom walls 7 and hence, the energy storage devices 1, 1*a* can be efficiently cooled whereby the energy storage module enables relatively large inputting and outputting of energy which is accompanied with generation of heat.

Other Embodiments

The above-mentioned embodiments are not intended to limit the configuration of the present invention. Accordingly, it should be construed that the above-mentioned embodiments can be modified by omission, replacement or addition of constitutional elements of respective parts of the embodiments based on the description of this specification and the common general technical knowledge, and all these modifications also fall within the scope of the present invention.

Only the positive electrode external terminal or the negative electrode external terminal may be mounted on the front wall, and the negative electrode tabs or the positive electrode tabs of the stacked electrode assembly may be connected to the front wall. In this case, a potential of the case becomes equal to a potential of the negative electrode plate or the positive electrode plate so that an outer wall (typically, a front wall) of the case is used as a negative electrode external terminal or a positive electrode external terminal for connection with an external circuit.

The present invention is not limited to the configuration where tabs are connected to the external terminal through the current collecting member. That is, the positive electrode tabs and the negative electrode tabs of the stacked electrode assembly may be directly connected to the positive electrode external terminal and the negative electrode external terminal respectively.

The case is not limited to the case which is formed of the bottomed cylindrical case body and the lid body. As an example, the case of the energy storage device according to the present invention may be a case which includes: a cylindrical body forming a bottom wall, a ceiling wall and a pair of side walls; and a pair of lid bodies which respectively forms a front wall and a rear wall while sealing both ends of the cylindrical body.

INDUSTRIAL APPLICABILITY

The energy storage device and the energy storage module according to the present invention are particularly preferably applicable to a vehicle-use power source.

DESCRIPTION OF REFERENCE SIGNS

1, 1*a*: energy storage device
2, 2*a*: case
3: stacked electrode assembly
4: positive electrode external terminal
5: negative electrode external terminal
6: rupture valve
7: bottom wall
8: ceiling wall
9, 9*a*: front wall
10: rear wall
11: side wall
12: positive electrode plate
13: negative electrode plate
14: separator
15: positive electrode tab
16: negative electrode tab
17: positive electrode current collecting member
18: negative electrode current collecting member
19: outer gasket
20: inner gasket
21: porous sheet
31: holder
32: bus bar
33: cooling member

The invention claimed is:

1. An energy storage module comprising:

a plurality of energy storage devices, each energy storage device of the plurality of energy storage devices comprising:

a case formed in a rectangular parallelepiped shape, and having a bottom wall and a ceiling wall, a front wall and a rear wall having areas smaller than an area of the ceiling wall respectively, and a pair of side walls having areas larger than the area of the ceiling wall respectively;

an electrode assembly accommodated in the inside of the case, and having a positive electrode plate and a negative electrode plate stacked to each other with a separator interposed between the positive electrode plate and the negative electrode plate, and a positive electrode tab and a negative electrode tab extending from the positive electrode plate and the negative electrode plate toward the front wall;

an external terminal mounted on the front wall and electrically connected with the positive electrode tab or the negative electrode tab; and a rupture valve mounted on the rear wall, wherein the bottom wall is mounted on a mounting surface, and the front wall is raised from the bottom wall, the rupture valve is mounted at a position shifted from a center of the rear wall in a direction in which the bottom wall and the ceiling wall opposedly face each other, and wherein the rupture valve includes a flap-shaped portion, the energy storage module further comprising, a holder capable of holding the plurality of energy storage devices in a state where the energy storage devices are arranged in two rows, wherein the energy storage devices disposed adjacently to each other in the each row have the side walls thereof opposedly face each other, the energy storage devices disposed adjacently to each other between the rows have rear walls thereof opposedly face each other, and a shifted position of the rupture valve mounted on one of the two rear walls which opposedly face each other between the rows and a shifted position of the rupture valve mounted on the other of the two rear walls which opposedly face each other between the rows are disposed opposite to each other with respect to a center of the rear wall in a direction in which the bottom wall and the ceiling wall opposedly face each other.

2. The energy storage module according to claim 1, each said energy storage device further comprising a porous sheet disposed between an inner surface of the rear wall and the stacked electrode assembly and covering an inner surface of the rupture valve.

3. The energy storage module according to claim 1, wherein the case includes: a case body forming the bottom wall, the ceiling wall, the rear wall and the pair of side walls; and a lid plate forming the front wall and being capable of sealing an opening of the case body.

4. An energy storage module comprising:

a plurality of energy storage devices, each of said energy storage devices comprising:

a case formed in a rectangular parallelepiped shape, and having a bottom wall and a ceiling wall, a front wall and a rear wall having areas smaller than an area of the ceiling wall respectively, and a pair of side walls having areas larger than the area of the ceiling wall respectively;

a stacked electrode assembly accommodated in the inside of the case, and having a plurality of positive electrode plates and a plurality of negative electrode plates having a plate shape and stacked to each other with a separator interposed between the positive electrode plate and the negative electrode plate, and a positive electrode tab and a negative electrode tab extending from the positive electrode plates and the negative electrode plates toward the front wall;

an external terminal mounted on the front wall and electrically connected with the positive electrode tab or the negative electrode tab; and a rupture valve mounted on the rear wall, wherein the bottom wall is mounted on a mounting surface, and the front wall is raised from the bottom wall, and the rupture valve is mounted at a position shifted from a center of the rear wall in a direction in which the bottom wall and the ceiling wall opposedly face each other; and a holder capable of holding the plurality of energy storage devices in a state where the energy storage devices are arranged in two rows, wherein the energy storage devices disposed adjacently to each other in the each row have the side walls thereof opposedly face each other, the energy storage devices disposed adjacently to each other between the rows have rear walls thereof opposedly face each other, a shifted position of the rupture valve mounted on one of the two rear walls which opposedly face each other between the rows and a shifted position of the rupture valve mounted on the other of the two rear walls which opposedly face each other between the rows are disposed opposite to each other with respect to a center of the rear wall in a direction in which the bottom wall and the ceiling wall opposedly face each other, and wherein the rupture valve mounted on one of the two rear walls which opposedly face each other between the rows and the rupture valve mounted on the other of the two rear walls which opposedly face each other between the rows do not overlap with each other in the direction that the bottom wall and the ceiling wall opposedly face each other.

5. The energy storage module according to claim 4, wherein a gas discharge passage is defined between one and the other of the two rear walls which opposedly face each other between the rows.

6. The energy storage module according to claim 1, wherein the rupture valve mounted on one of the two rear walls which opposedly face each other between the rows and the rupture valve mounted on the other of the two rear walls which opposedly face each other between the rows do not overlap with each other in the direction that the bottom wall and the ceiling wall opposedly face each other.

7. The energy storage module according to claim 2, wherein the porous sheet comprises a sheet comprising a cushion property, and wherein the porous sheet is configured to form a flow passage for discharging a gas to an outside of the energy storage device through the rupture valve.

8. The energy storage module according to claim 1, wherein the shifted position of the rupture valve mounted on one of the two rear walls which opposedly face each other between the rows and the shifted position of the rupture valve mounted on the other of the two rear walls which opposedly face each other between the rows are disposed opposite to each other with respect to a center of the rear wall in a vertical direction.

9. An energy storage module comprising:

a plurality of energy storage devices, each energy storage device of the plurality of energy storage devices comprising:

a case formed in a rectangular parallelepiped shape, and having a bottom wall and a ceiling wall, a front wall and a rear wall having areas smaller than an area of the ceiling wall respectively, and a pair of side walls having areas larger than the area of the ceiling wall respectively;

an electrode assembly accommodated in the inside of the case, and having a positive electrode plate and a negative electrode plate stacked to each other with a separator interposed between the positive electrode plate and the negative electrode plate, and a positive electrode tab and a negative electrode tab extending from the positive electrode plate and the negative electrode plate toward the front wall;

an external terminal mounted on the front wall and electrically connected with the positive electrode tab or the negative electrode tab;

a rupture valve mounted on the rear wall; and a porous sheet disposed between an inner surface of the rear wall and the electrode assembly and covering an inner surface of the rupture valve, wherein the bottom wall is mounted on a mounting surface, and the front wall is raised from the bottom wall, and wherein the rupture valve is mounted at a position shifted from a center of the rear wall in a direction in which the bottom wall and the ceiling wall opposedly face each other, the energy storage module further comprising:

a holder capable of holding the plurality of energy storage devices in a state where the energy storage devices are arranged in two rows, wherein the energy storage devices disposed adjacently to each other in the each row have the side walls thereof opposedly face each, the energy storage devices disposed adjacently to each other between the rows have rear walls thereof opposedly face each other, and a shifted position of the rupture valve mounted on one of the two rear walls which opposedly face each other between the rows and a shifted position, of the rupture valve mounted on the other of the two rear walls which opposedly face each other between the rows are disposed opposite to each other with respect to a center of the rear wall in, a direction in which the bottom wall and the ceiling wall opposedly face each other, and wherein a gas discharge passage is defined between one and the other of the two rear walls which opposedly face each other between the rows.

10. The energy storage module according to claim 9, wherein the case includes: a case body forming the bottom wall, the ceiling wall, the rear wall and the pair of side walls; and a lid plate forming the front wall and being capable of sealing an opening of the case body.

11. The energy storage module according to claim 9, wherein the rupture valve includes a flap-shaped portion.

12. The energy storage module according to claim 9, wherein the porous sheet comprises a sheet comprising a cushion property; and wherein the porous sheet comprises a resin foamed body.

13. The energy storage module according to claim 11, wherein the porous sheet is configured to form a flow passage for discharging a gas to an outside of the energy storage device through the rupture valve.

14. The energy storage module according to claim 9, wherein the shifted position of the rupture valve mounted on one of the two rear walls which opposedly face each other between the rows and the shifted position of the rupture valve mounted on the other of the two rear walls which opposedly face each other between the rows are disposed opposite to each other with respect to a center of the rear wall in a vertical direction.

15. The energy storage module according to claim 9, wherein said rupture valve includes a groove.

16. The energy storage module according to claim 9, wherein said rupture valve includes a tongue-shaped portion.

17. The energy storage module according to claim 9, wherein said rupture valve has a decreased thickness in a predetermined area as compared to other areas of the rupture valve.

18. The energy storage module according to claim 15, wherein, when an internal pressure of the energy storage device increases, the rupture valve beaks along the groove to form a flat-shaped portion and an opening is formed in the rear wall by flipping the flap-shaped portion to an outside.

* * * * *